United States Patent
Li

(10) Patent No.: US 11,405,557 B1
(45) Date of Patent: Aug. 2, 2022

(54) ROLLING SHUTTER COMPENSATION FOR MOVING DIGITAL OPTICAL CAMERA SENSORS

(71) Applicant: Locus Robotics Corp., Wilmington, MA (US)

(72) Inventor: Changchun Li, Concord, MA (US)

(73) Assignee: Locus Robotics Corp., Wilmington, MA (US)

( * ) Notice: Subject to any disclaimer, the term of this patent is extended or adjusted under 35 U.S.C. 154(b) by 0 days.

(21) Appl. No.: 17/380,154

(22) Filed: Jul. 20, 2021

(51) Int. Cl.
  *H04N 5/232* (2006.01)
  *B60R 1/00* (2022.01)
  (Continued)

(52) U.S. Cl.
  CPC .......... *H04N 5/2329* (2013.01); *B25J 9/1697* (2013.01); *B25J 19/023* (2013.01); *B60R 1/00* (2013.01); *G06T 1/0014* (2013.01); *G06T 3/0093* (2013.01); *H04N 5/23258* (2013.01); *H04N 5/23267* (2013.01); *B60R 11/04* (2013.01); *B60R 2300/302* (2013.01); *G06T 2207/20182* (2013.01)

(58) Field of Classification Search
  CPC ............. H04N 5/2329; H04N 5/23267; H04N 5/3532; H04N 5/23264; B25J 9/1697; B25J 19/023; G06T 1/0014; G06T 3/0093; G06T 2207/20182
  See application file for complete search history.

(56) References Cited

U.S. PATENT DOCUMENTS 8,350,922 B2 * 1/2013 D'Angelo ............ H04N 5/2329
  348/222.1
9,124,807 B2 * 9/2015 Tsubaki ............... H04N 5/2329
(Continued)

FOREIGN PATENT DOCUMENTS

JP   2010154390 A * 7/2010 ............ H04N 5/2329
KR  20200064866 A * 6/2020 ............ G06K 9/3258

OTHER PUBLICATIONS

L. O'Sullivan and P. Corke, "Empirical modelling of rolling shutter effect," 2014 IEEE International Conference on Robotics and Automation (ICRA), 2014, pp. 2132-2137, doi: 10.1109/ICRA.2014.6907152. (Year: 2014).*

(Continued)

*Primary Examiner* — John Villecco
(74) *Attorney, Agent, or Firm* — Sunstein LLP

(57) ABSTRACT

A method for rolling shutter compensation for a camera sensor mounted on a moving vehicle includes estimating, based on a plurality of images of an object, a speed and a direction of movement of the vehicle; acquiring an additional image of the object having four corners; estimating a location of each of the four corners of the object in an image plane defined by the additional image; determining a corrected location in 3D space for each of the four corners of the object; determining a first compensated location for each of the four corners of the object in the image plane; determining a second compensated location for each of the four corners of the object in the image plane; and determining a difference between the first compensated locations of the four corners of the object and the second compensated locations of the four corners of the object.

12 Claims, 8 Drawing Sheets

(51) Int. Cl.
*B25J 19/02* (2006.01)
*B25J 9/16* (2006.01)
*G06T 3/00* (2006.01)
*G06T 1/00* (2006.01)
*B60R 11/04* (2006.01)

(56) References Cited

U.S. PATENT DOCUMENTS

| | | | | |
|---|---|---|---|---|
| 9,602,725 | B2* | 3/2017 | Mantzel | H04N 5/23267 |
| 10,397,479 | B2* | 8/2019 | Purkait | G05D 1/0088 |
| 10,498,966 | B2* | 12/2019 | Wheeler | G01S 7/4817 |
| 10,771,699 | B2* | 9/2020 | Zhou | H04N 5/2329 |
| 10,839,231 | B2* | 11/2020 | Ermilios | G06V 20/588 |
| 10,911,680 | B2* | 2/2021 | Kerr | G06T 5/20 |
| 2014/0071299 | A1* | 3/2014 | Grundmann | H04N 5/23264 348/208.99 |
| 2014/0160309 | A1* | 6/2014 | Karpenko | H04N 5/23267 348/208.6 |
| 2017/0374256 | A1* | 12/2017 | Wagner | G06T 7/73 |
| 2019/0098217 | A1* | 3/2019 | Zhou | H04N 5/3532 |
| 2020/0389595 | A1* | 12/2020 | Zhou | H04N 5/2329 |
| 2021/0148707 | A1* | 5/2021 | Kawabayashi | G01C 21/1652 |
| 2021/0208283 | A1* | 7/2021 | Zhao | H04N 5/2329 |

OTHER PUBLICATIONS

D. Schubert, N. Demmel, L. v. Stumberg, V. Usenko and D. Cremers, "Rolling-Shutter Modelling for Direct Visual-Inertial Odometry," 2019 IEEE/RSJ International Conference on Intelligent Robots and Systems (IROS), 2019, pp. 2462-2469, doi: 10.1109/IROS40897.2019.8968539. (Year: 2019).*

Steven P. Nicklin et al., *Rolling Shutter Image Compensation*, G. Kakemeyer et al. (Eds.): RoboCup 2006: Robot Soccer World Cup X Lecture Notes in Computer Science, vol. 4434, 2007, pp. 402-409.

Chia-Kai Liang et al., *Analysis and Compensation of Rolling Shutter Effect*, IEEE Transaction on Image Processing, vol. 17, No. 8, Aug. 2008, pp. 1323-1330.

* cited by examiner

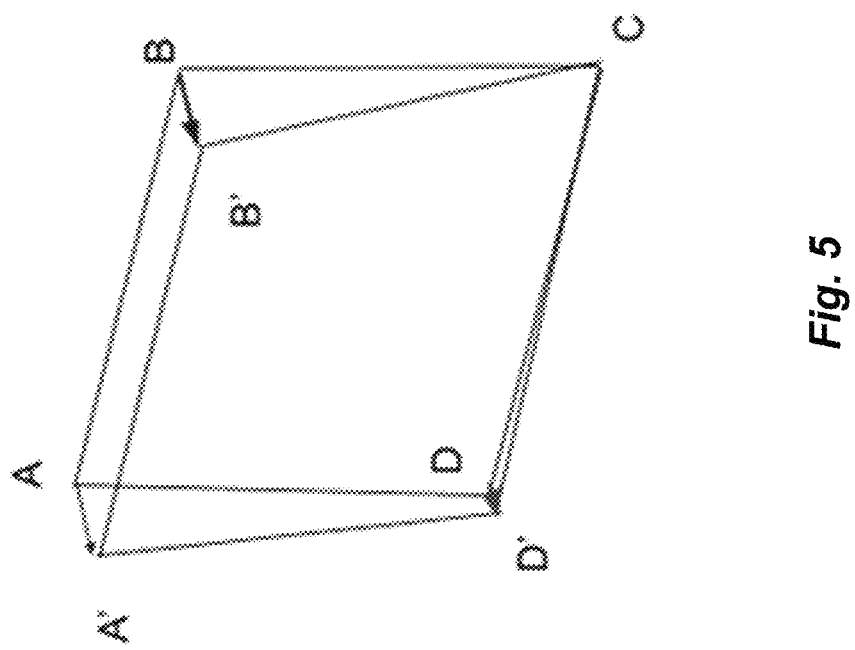

ROLLING SHUTTER COMPENSATION FOR MOVING DIGITAL OPTICAL CAMERA SENSORS

TECHNICAL FIELD

The present invention relates to image distortion correction, and more particularly to compensating the effects of rolling shutter for moving digital optical camera sensors, such as cameras mounted on moving vehicles.

BACKGROUND ART

In many applications, robots are used to perform functions in place of humans or to assist humans in order to increase productivity and efficiency. One such application is order fulfillment, which is typically performed in a large warehouse filled with products to be shipped to customers who have placed their orders over the internet for home delivery. Fulfilling such orders in a timely, accurate and efficient manner is logistically challenging to say the least. An important goal of the order fulfillment process is thus to ship as many items in as short a time as possible. The process of receiving an order, planning its fulfillment, finding the storage shelf or bin, picking the product, and repeating the process for each item on the order, then delivering the order to a shipping station is repetitive and labor intensive. In a warehouse stocked with thousands or tens of thousands of items of rapidly turning inventory, robots play a critical role in ensuring timely and efficient order fulfillment. In addition, the products that will ultimately be shipped first need to be received in the warehouse and stored or "placed" in storage bins in an orderly fashion throughout the warehouse so they can be readily retrieved for shipping.

To navigate the warehouse, robots employ, among other things, digital optical camera sensors. Many camera sensors acquire images using a so-called rolling shutter. Rolling shutter is a method of image capture in which a picture is captured not by taking a snapshot of the entire scene at a single instant in time, but rather by scanning across the scene vertically and/or horizontally. The advantage of rolling shutter is that the image sensor can continue to gather photons during the acquisition process. However, rolling shutter also leads to not all parts of the image being recorded at exactly the same time. Therefore, distortions are produced if the object captured or the camera itself is moving, such as when the camera is mounted on a moving robot or other vehicle.

One of the rolling shutter distortions that needs to be compensated when acquiring images of a stationary object with a moving camera is skew. The image bends diagonally in one direction or another as the camera moves from one side to another, exposing different parts of the image at different time points. One solution known in the art is to de-skew the entire image, such as described in Nicklin, S. P., et al., Rolling Shutter Image Compensation, in: Lakemeyer, G., et al., *RoboCup 2006: Robot Soccer World Cup X, Lecture Notes in Computer Science, vol.* 4434, Springer, Berlin, Heidelberg (2007). However, de-skewing the entire image leads to a low accuracy of distortion correction if the distance between the camera and the imaged object is unknown. Another known method to reduce skew is global motion estimation, such as described in Liang, C., et al., Analysis and Compensation of Rolling Shutter Effect, *IEEE Transactions on Image Processing, vol,* 17, 1323-1330 (2008). However, since global motion estimation requires a two-dimensional motion model, it does not perform well in three-dimensional (3D) space. Therefore, there is a need for an improved rolling shutter compensation approach suitable for use in 3D space, such as for robots moving within a warehouse.

SUMMARY OF THE EMBODIMENTS

In accordance with one embodiment of the invention, a computer-implemented method for rolling shutter compensation for a camera sensor mounted on a moving vehicle includes computer processes, carried out by a computer system coupled to the camera sensor, including: (a) estimating, by the computer system, based on a plurality of images of an object acquired by the camera sensor, the object having four corners, a speed and a direction of movement of the vehicle; (b) acquiring, by the camera sensor, an additional image of the object, wherein the additional image includes the four corners of the object; (c) estimating, by the computer system, based on the additional image of the object, a location of each of the four corners of the object in an image plane defined by the additional image; (d) determining, by the computer system, based on the speed and direction of movement of the vehicle and the estimated locations of the four corners, a corrected location in 3D space for each of the four corners of the object; (e) determining, by the computer system, a first compensated location for each of the four corners of the object in the image plane; (f) repeating steps a through d and determining, by the computer system, a second compensated location for each of the four corners of the object in the image plane; and (g) determining, by the computer system, a difference between the first compensated locations of the four corners of the object and the second compensated locations of the four corners of the object.

Alternatively or in addition, estimating the speed and the direction of movement of the vehicle further includes determining, by the computer system, a distance from the camera sensor to each one of the plurality of images of the object.

Also alternatively or in addition, estimating the speed and the direction of movement of the vehicle is further based on an acquisition time of each one of the plurality of images of the object.

Further alternatively or in addition, determining the first and second compensated locations of the four corners of the object further includes projecting, by the computer system, the corrected locations of the four corners in 3D space onto the image plane.

In a related embodiment, the moving vehicle is a robot.

In accordance with another embodiment of the invention, a moving vehicle includes a camera sensor and a processor coupled to the camera sensor. The processor is configured to: (a) estimate, based on a plurality of images of an object acquired by the camera sensor, the object having four corners, a speed and a direction of movement of the moving vehicle; (b) receive, from the camera sensor, an acquired additional image of the object, wherein the additional image includes the four corners of the object; (c) estimate, based on the additional image of the object, a location of each of the four corners of the object in an image plane defined by the additional image; (d) determine, based on the speed and direction of movement of the camera sensor and the estimated locations of the four corners, a corrected location in 3D space for each of the four corners of the object; (e) determine a first compensated location for each of the four corners of the object in the image plane; (f) repeat steps a through d and determine a second compensated location for each of the four corners of the object in the image plane; and (g) determine a difference between the first compensated locations of the four corners of the object and the second compensated locations of the four corners of the object.

Alternatively or in addition, to estimate the speed and the direction of movement of the robot, the processor is further configured to determine a distance from the camera sensor to each one of the plurality of images of the object.

Also alternatively or in addition, estimating the speed and the direction of movement of the camera sensor is further based on an acquisition time of each one of the plurality of images of the object.

Further alternatively or in addition, to determine the first and second compensated locations of the four corners of the object, the processor is further configured to project the corrected locations of the four corners in 3D space onto the image plane.

Alternatively or in addition, estimating the speed and the direction of movement of the moving vehicle is further based on a known location of the object.

In accordance with yet another embodiment of the invention, a robot includes a mobile base, a camera sensor mounted on the mobile base, and a processor coupled to the camera sensor. The processor is configured to: (a) estimate, based on a plurality of images of an object acquired by the camera sensor, the object having four corners, a speed and a direction of movement of the robot; (b) receive, from the camera sensor, an acquired additional image of the object, wherein the additional image includes the four corners of the object; (c) estimate, based on the additional image of the object, a location of each of the four corners of the object in an image plane defined by the additional image; (d) determine, based on the speed and direction of movement of the camera sensor and the estimated locations of the four corners, a corrected location in 3D space for each of the four corners of the object; (e) determine a first compensated location for each of the four corners of the object in the image plane; (f) repeat steps a through d and determine a second compensated location for each of the four corners of the object in the image plane; and (g) determine a difference between the first compensated locations of the four corners of the object and the second compensated locations of the four corners of the object.

BRIEF DESCRIPTION OF THE DRAWINGS

The foregoing features of embodiments will be more readily understood by reference to the following detailed description, taken with reference to the accompanying drawings, in which:

FIG. 5 is a diagram illustrating rolling shutter compensation for four corners of an imaged object as projected to the world coordinate system

DETAILED DESCRIPTION OF SPECIFIC EMBODIMENTS

Definitions. As used in this description and the accompanying claims, the following terms shall have the meanings indicated, unless the context otherwise requires:

A "computer process" is the performance of a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process" we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

A "set" has at least one member.

A "robot" is a machine capable of movement that uses data received from a digital optical camera sensor. For example, a robot may be an autonomous warehouse vehicle, automobile, truck, or similar device.

A "pose" is a location and orientation of a device, such as a robot or a digital optical camera sensor.

A "moving vehicle" is a robot, automobile, truck, forklift, or any other automated guided vehicle.

Figure 1:
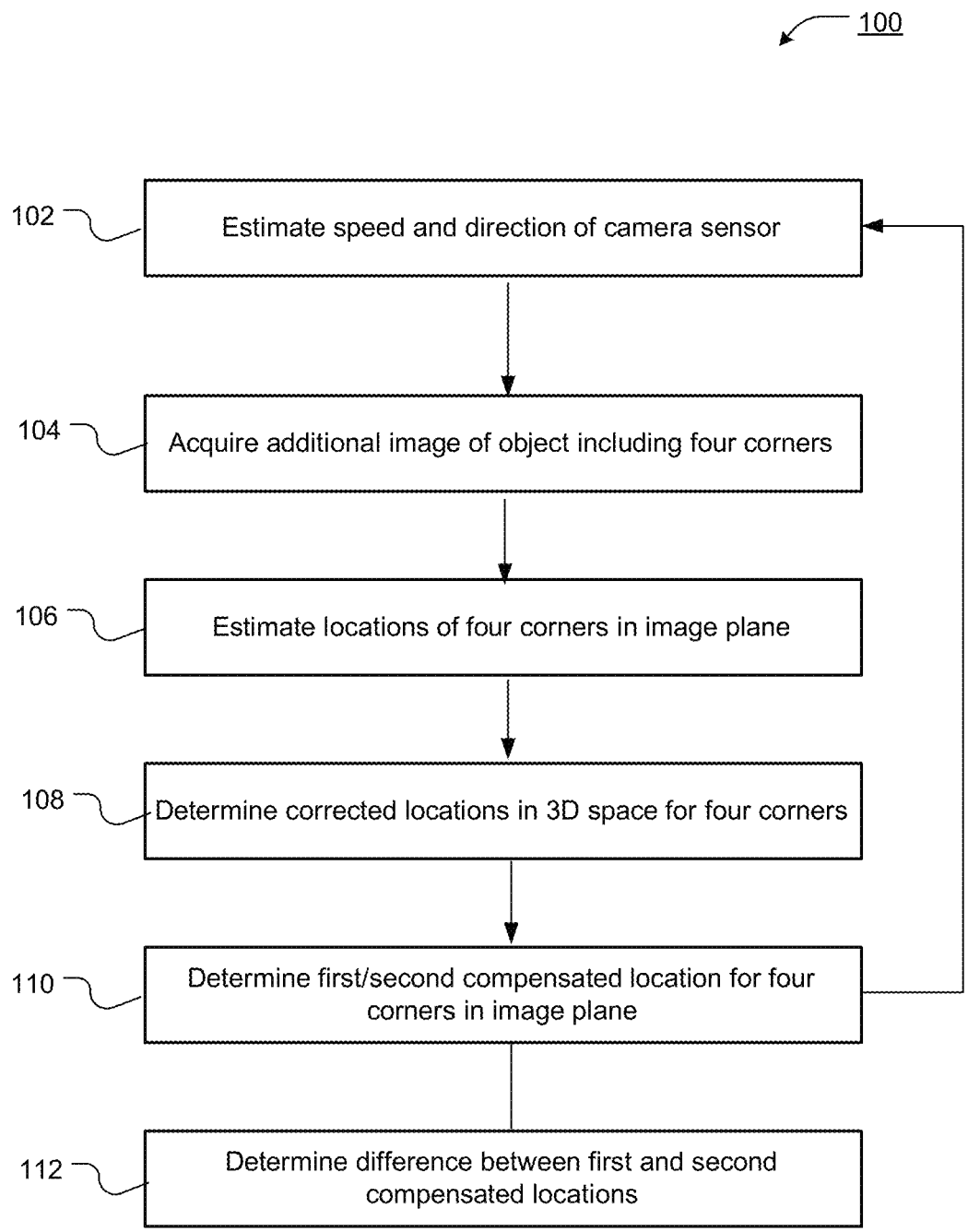
FIG. 1 is a flow diagram of a method for rolling shutter compensation for a moving camera sensor in accordance with an embodiment of the present disclosure.

FIG. 1 is a flow diagram of a computer-implemented method 100 for rolling shutter compensation for a moving camera sensor in accordance with an embodiment of the present disclosure. The camera sensor may, for example, be mounted on a moving vehicle, such as a robot. The moving vehicle, and thus the moving camera sensor, has a speed and a direction of movement. The camera sensor is coupled to a computer system that carries out computer processes, including the steps of method 100.

In step 102, the speed and direction of movement of the camera sensor are estimated based on a plurality of images of an object that the camera sensor has acquired. The object has four corners and may, for example, be a tag that contains a barcode. The object further is stationary. The plurality of images of the object was acquired at known points in time while the sensor was moving. For example, a first image was acquired at time $t_1$, and a second image was acquired at time $t_2$.

Figure 2:
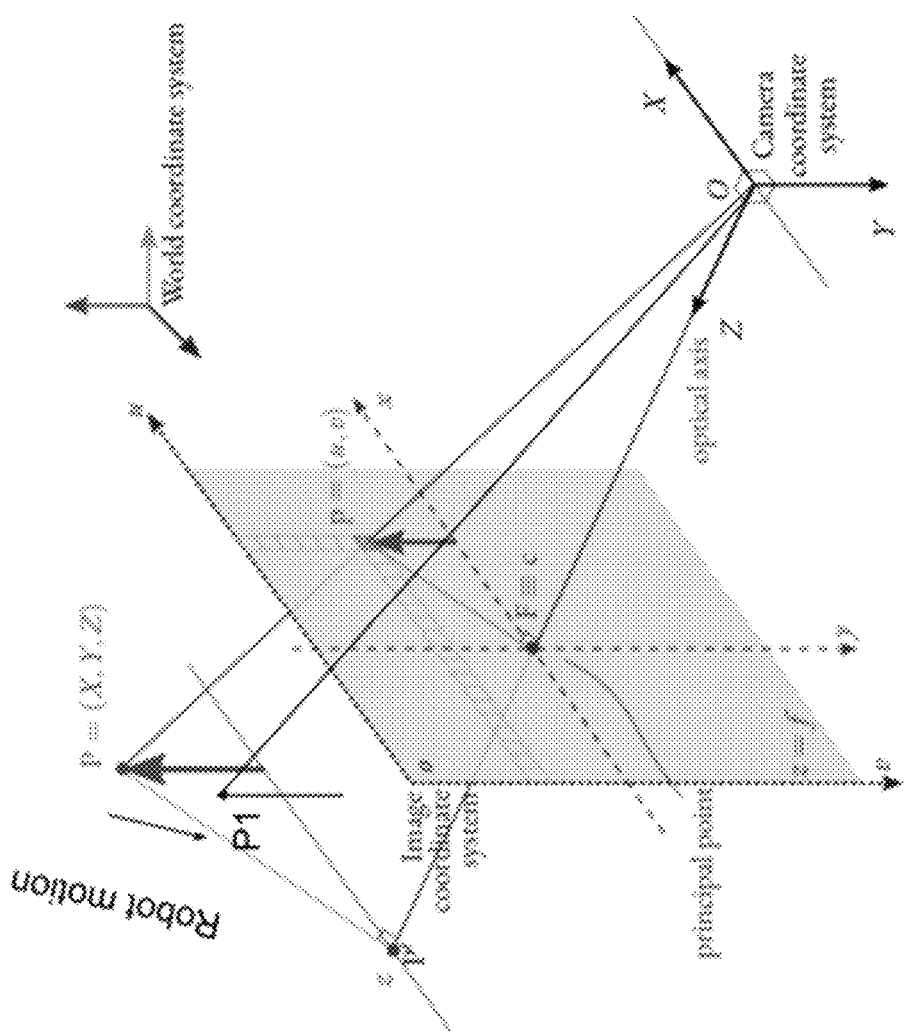
FIG. 2 is a diagram illustrating a known method to project a point whose location is given in an image or pixel coordinate system to the world coordinate system.

To estimate the speed and direction of movement of the camera sensor, the locations of the center points of the object in the world coordinate system are required. FIG. 2 illustrates a known method to project a point whose location is given in an image or pixel coordinate system to the world coordinate system. The method of FIG. 2 is based on known intrinsic and extrinsic parameters of the camera and a pinhole camera model. The intrinsic parameters can be calculated by calibrating the camera. The extrinsic parameters, rotation and translation of the camera, can be determined by assuming that the camera is not rotated and by estimating a distance from the camera sensor to the object, whose position in world coordinates is known. This distance forms the Z coordinate of an exemplary point P on the object. Using this method, the location of point P in image coordinates (u,v) can be projected to a location of point P in world coordinates (X,Y,Z).

Figure 3:
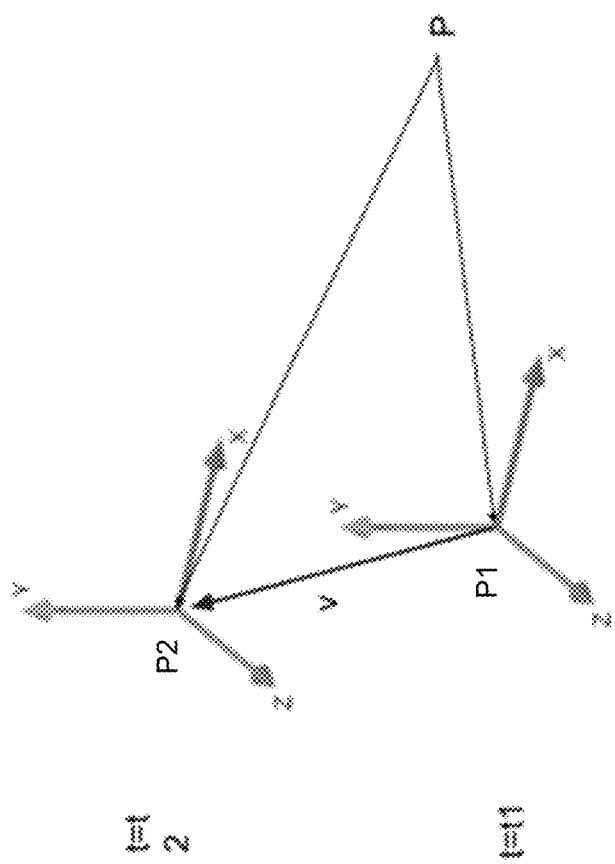
FIG. 3 is a diagram showing how speed and direction of movement of the moving camera sensor can be estimated.

FIG. 3 shows how speed and direction of movement of the moving camera sensor can be estimated. P is a center point of an object whose position in world coordinates is known. Images of point P are acquired with a moving camera at two different time points $t_1$ and $t_2$. This method assumes that the camera sensor moves with constant speed and that the two images are acquired within a very short time. For example, the camera may acquire images with a frame rate of 6 frames per second, i.e., time points $t_1$ and $t_2$ are one sixth of a second apart. Also, exemplarily, the camera may move at speed of 1.1 meters per second. From an image acquired at time $t_1$, acquired point P is projected onto point P1 in the world coordinate system. The camera moves between time points $t_1$ and $t_2$ with a direction and distance defined by movement vector v. Therefore, point P from an image acquired at time point $t_2$ is projected onto point P2 in the world coordinate system. The relationship between points P1 and P2 can be expressed by the following equation:

$$P_2 = P_1 + v*(t_2 - t_1) = P_1 + v*\Delta t$$

It follows that the movement vector v can be calculated as:

$$v = \frac{P_2 - P_1}{\Delta t}$$

The movement vector v includes the direction of movement of the camera. From the length of vector v, the speed of movement of the camera can be determined.

Referring back to FIG. 1, the method 100 now proceeds to step 104 in which an additional image of the object is acquired by the moving camera sensor. The additional image also includes all four corners of the object.

In step 106, the locations of the four corners of the object as acquired in the additional image are detected in the image plane of the additional image. This detection assumes that there is no distortion and yields the location of the four corners in image space, i.e., in pixel coordinates. In addition to the four corners, a location of the object itself, for example its center point, could be detected or estimated. It is also expressly contemplated that the location of the object and/or of its corners could be estimated in world coordinates.

Figure 4:
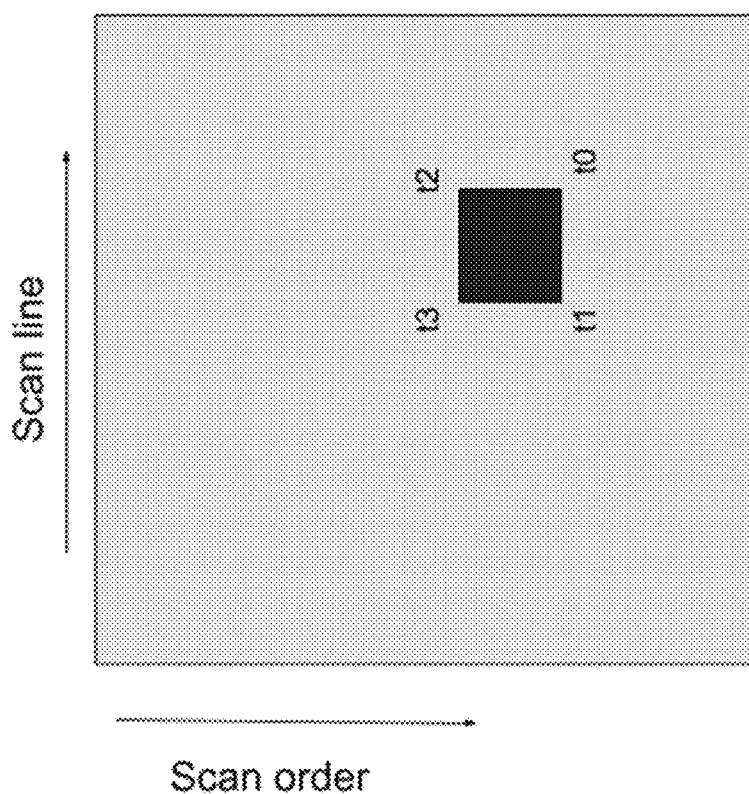
FIG. 4 is a diagram showing how the rolling shutter effect affects the acquisition of an image.

In step 108, corrected locations in 3D space for each of the four corners of the object in image space are determined. FIG. 4 shows how the rolling shutter effect affects the acquisition of an image, such as the additional image acquired in step 104. The camera sensor acquires the pixels of an image in a certain order and with a certain speed, commonly called the pixel clock. Illustratively, as shown in FIG. 4, pixels are acquired row by row from left to right and top to bottom. The first pixel acquired is the one in the top left corner of the image, followed by the pixel immediately to the right of it in the top row, and so forth. After the first horizontal row of pixels is acquired, the row immediately to the bottom of it follows, again from left to right. The last pixel acquired is the pixel in the bottom right corner. Since the camera sensor is acquiring the individual pixels one by one at the speed of its pixel clock instead of acquiring the whole image at once, the image is skewed due to the rolling shutter effect.

The four corners of the object as detected in the additional image have therefore been acquired at four different time points $t_0$, $t_1$, $t_2$, and $t_3$, as shown in FIG. 4. The top left pixel was acquired first at time point $t_3$, followed by the top right pixel at time point $t_2$, followed by the bottom left pixel at time point $t_1$, followed by the top right pixel at time point $t_0$.

The pixel corresponding to the bottom right corner of the object was acquired last at time $t_0$, which we define as the baseline with zero time difference. We now label the pixel acquired at time $t_0$, i.e. the pixel corresponding to the bottom right corner of the object, as $I_0$, the pixel acquired at time $t_1$, i.e. the pixel corresponding to the bottom left corner of the object, as $I_1$, the pixel acquired at time $t_2$, i.e. the pixel corresponding to the top right corner of the object, as $I_2$, and the pixel acquired at time $t_3$, i.e. the pixel corresponding to the top left corner of the object, as $I_3$. Each pixel has an x coordinate and a y coordinate in the image coordinate system. The width and height of the object in pixel coordinates can therefore be expressed as:

$$\text{Width} = I_0(x) - I_1(x)$$

$$\text{Height} = I_1(y) - I_2(y)$$

We further know that the image was acquired with a certain pixel clock denoted as $\text{Clk}_{pixel}$. The acquisition time points of the four corner pixels can therefore be calculated as follows, starting from the baseline $t_0$:

$$t_0 = 0$$

$$t_1 = -\frac{\text{Width}}{\text{Clk}_{pixel}}$$

$$t_2 = t_1 - \text{Height} * \frac{\text{Width}}{\text{Clk}_{pixel}}$$

$$t_3 = t_2 - \frac{\text{Width}}{\text{Clk}_{pixel}}$$

The locations of the four pixels in the image plane are now projected onto the world coordinate system, for example using the method discussed above with reference to FIG. 2. FIG. 5 shows the four corners of the object as projected to the world coordinate system. The top left corner, pixel $I_0$, is projected to point A. The top right corner, pixel $I_1$, is projected to point B. The bottom left corner, pixel $I_2$, is projected to point D. The bottom right corner, pixel $I_3$, is projected to point C. However, due to the rolling shutter effect, the projected locations of the four corners in the world coordinate system are not accurate and need to be corrected based on the four time points calculated above. Point C does not require correction since it was acquired last at time point $t_0$. The corrected location A' of point A can be calculated as follows:

$$A' = A + v*t_2$$

The corrected location B' of point B can be calculated as:

$$B' = B + v*t_1$$

The corrected location D' of point D can be calculated as:

$$D' = D + v*t_3$$

The vector v in the above equations denotes the movement vector of the camera sensor as determined in step 102.

Now that corrected locations of the four corners of the object have been calculated in the world coordinate system, the corrected locations are projected back onto the image plane in step 110. To achieve this projection, the inverse of the method shown above in reference to FIG. 2 could be used, or any other projection method known to a person skilled in the art. If the method 100 is in a first iteration, the projection results in first compensated locations for each of the four corners of the object in the image plane. If the method 100 is in a second iteration, the projection results in second compensated locations for each of the four corners of the object in the image plane.

The method 100 now returns back to step 102 to newly determine speed and direction of movement of the camera sensor. Since the location of the corners has changed through the correction applied in step 110, the distance between camera and object will be different. It follows that the movement vector v will be different in the second iteration of the method. Based on the updated movement vector v, steps 104, 106, 108, and 110 are repeated. It is however expressly noted that, even though the movement vector v was newly calculated based on the corrected locations A', B', C', and D', the second (and any following) iteration of the method 100 still uses the original non-corrected locations of the four corner points A, B, C, and D in the world coordinate system to perform the correction in step 108.

In step 112, a difference between the first compensated locations of each of the four corners of the object and the second compensated locations of each of the four corners is calculated. If this difference is smaller than a threshold value, the method ends. Otherwise, the method returns back to step 102 for a third iteration, resulting in third compensated locations of each of the four corners of the object, and so forth. The method iterates until the difference between the two most recent sets of compensated locations is below the threshold value or until a maximum number of iterations has been reached.

Figure 6A:
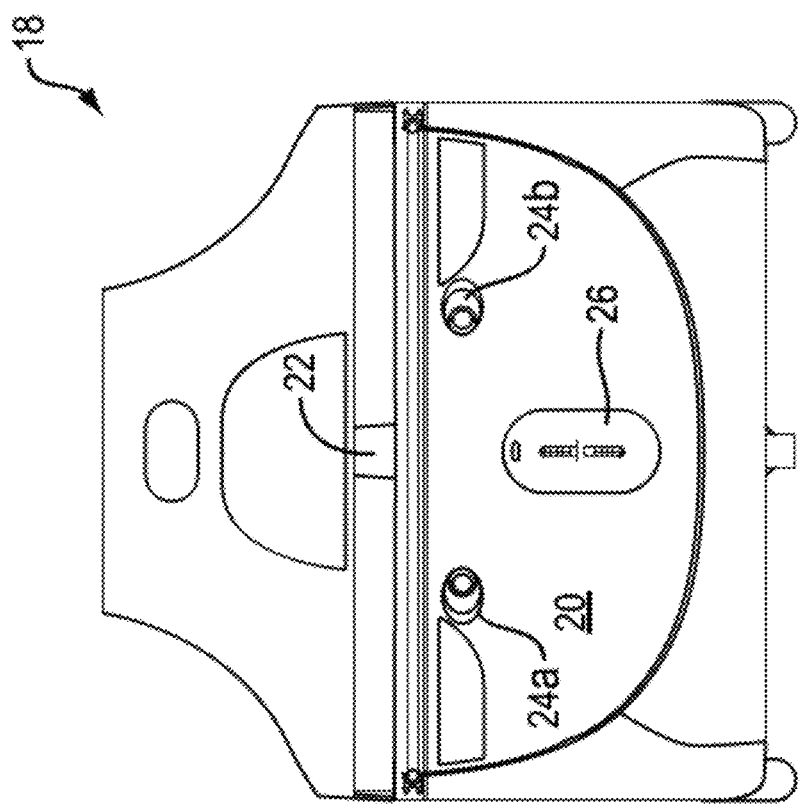
FIG. 6A is a front elevational view of a base of an exemplary robot used in a warehouse in accordance with an embodiment of the present disclosure.
Figure 6B:
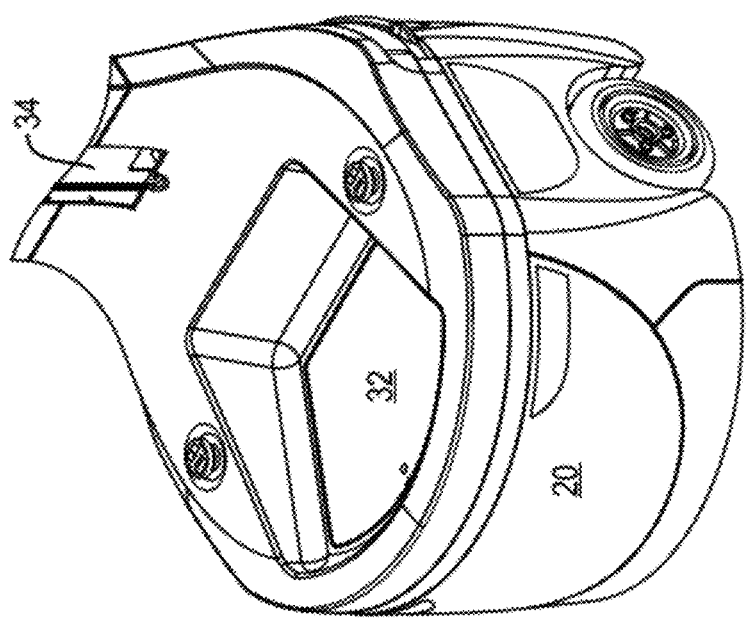
FIG. 6B is a perspective view of a base of one of the exemplary robots used in the warehouse in accordance with an embodiment of the present disclosure.
Figure 7:
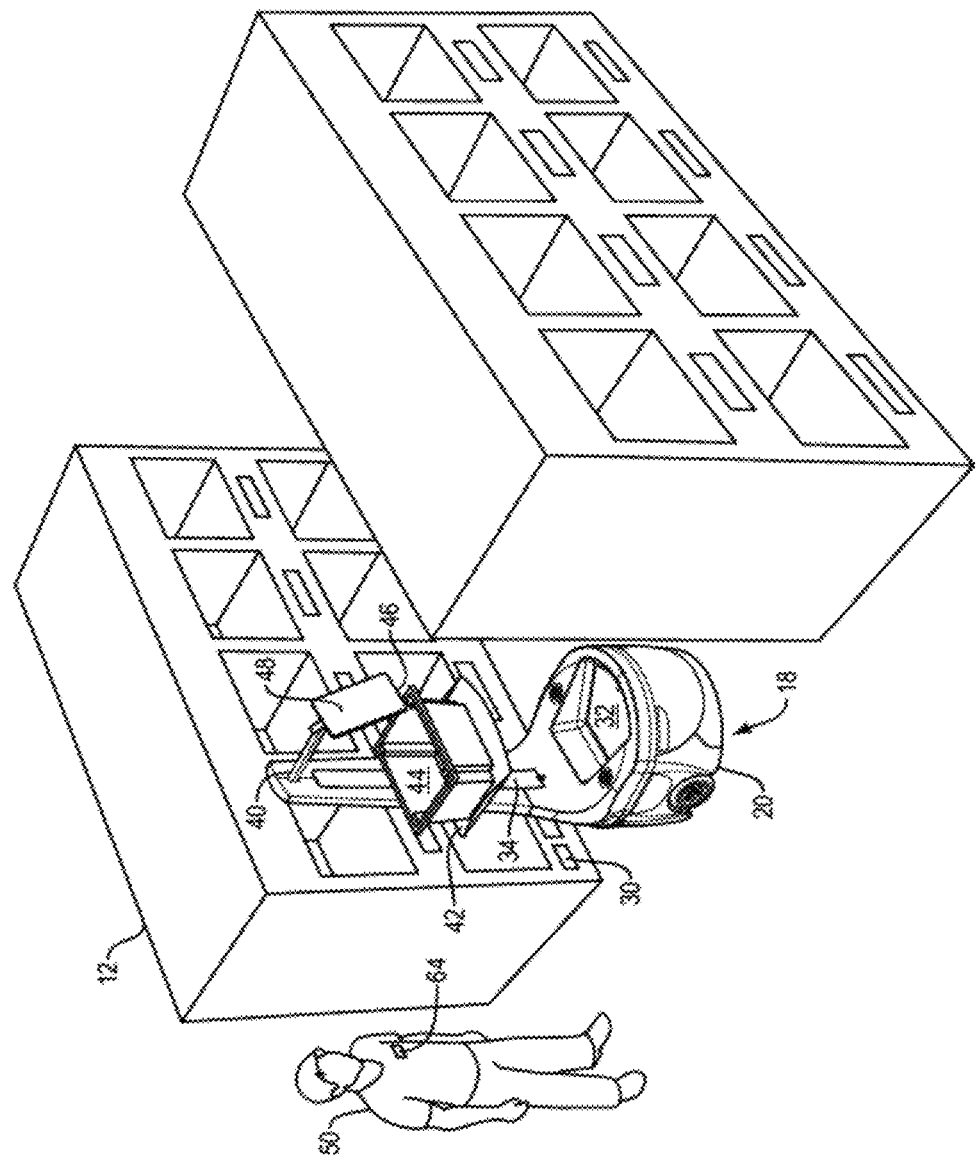
FIG. 7 is a perspective view of the robot of FIGS. 6A and 6B outfitted with an armature and parked in front of a shelf in the warehouse.

FIGS. 6A and 6B show an exemplary robot 18 in accordance with an embodiment of the present disclosure. The robot 18 includes an autonomous wheeled base 20 having a laser radar 22. The base 20 also features a transceiver (not shown) that enables the robot 18 to receive instructions from a server system, and a pair of digital optical cameras 24a and 24b. Each of the digital optical cameras 24a and 24b includes a camera sensor (not shown), of which at least one employs rolling shutter image acquisition. The robot base also includes an electrical charging port 26 for re-charging the batteries which power autonomous wheeled base 20. The base 20 further features a processor (not shown) that receives data from the laser radar 22 and cameras 24a and 24b to capture information representative of the robot's environment. There is a memory (not shown) that operates with the processor to carry out various tasks associated with navigation within a warehouse, as well as to navigate to a fiducial marker 30 placed on shelves 12, as shown in FIG. 7. Fiducial marker 30 (e.g. a two-dimensional bar code) corresponds to bin/location of an item ordered. Illustratively, the fiducial marker 30 is printed on a square or rectangular object that has four corners. Alternatively, fiducial marker 30 is an object that has four corners. Fiducial markers are also used to identify charging stations according to an aspect of this invention and the navigation to such charging station fiducial markers is the same as the navigation to the bin/location of items ordered.

The robot 18 may be configured to execute the computer-implemented method 100 as shown in FIG. 1. To this end, the processor and memory of the base 20 form part of a computer system that carries out processes including the steps of method 100. Alternatively or in addition, the computer system may include one or more processors and memories external to the base 20. The camera sensors of cameras 24a and 24b are coupled to the computer system such that acquired images can be transmitted to the computer system for processing and such that the computer system controls the image acquisition performed by the camera sensors.

Referring again to FIG. 6B, base 20 includes an upper surface 32 where a tote or bin could be stored to carry items. There is also shown a coupling 34 that engages any one of a plurality of interchangeable armatures 40, one of which is shown in FIG. 7. The particular armature 40 in FIG. 7 features a tote-holder 42 (in this case a shelf) for carrying a tote 44 that receives items, and a tablet holder 46 (or laptop/other user input device) for supporting a tablet 48. In some embodiments, the armature 40 supports one or more totes for carrying items. In other embodiments, the base 20 supports one or more totes for carrying received items. As used herein, the term "tote" includes, without limitation, cargo holders, bins, cages, shelves, rods from which items can be hung, caddies, crates, racks, stands, trestle, containers, boxes, canisters, vessels, and repositories.

Robot 18 may be picking items from a shelf by itself and placing them in the tote 44, or it may be assisted by a local operator 50. The local operator 50, which is typically human, carries out the task of physically removing an ordered item from a shelf 12 and placing it on robot 18, for example, in tote 44. The robot 18 communicates the order to the local operator 50 via the tablet 48 (or laptop/other user input device), which the local operator 50 can read, or by transmitting the order to a handheld device used by the local operator 50.

Upon receiving an order from the server system, the robot 18 proceeds to a first warehouse location, e.g. as shown in FIG. 7. It does so based on navigation software stored in the memory and carried out by the processor. The navigation software relies on data concerning the environment, as collected by the laser radar 22, an internal table in memory that identifies the fiducial identification of fiducial marker 30 that corresponds to a location in the warehouse where a particular item can be found, and the cameras 24a and 24b to navigate.

Upon reaching the correct location, the robot 18 parks itself in front of a shelf 12 on which the item is stored and waits for a local operator 50 to retrieve the item from the shelf 12 and place it in tote 44. If robot 18 has other items to retrieve it proceeds to those locations. The item(s) retrieved by robot 18 are then delivered to a packing station where they are packed and shipped.

Embodiments of the present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A computer-implemented method for rolling shutter compensation for a camera sensor mounted on a moving vehicle, the method including computer processes, carried out by a computer system coupled to the camera sensor, comprising:
    a. estimating, by the computer system, based on a plurality of images of an object acquired by the camera sensor, the object having four corners, a speed and a direction of movement of the vehicle;
    b. acquiring, by the camera sensor, an additional image of the object, wherein the additional image includes the four corners of the object;
    c. estimating, by the computer system, based on the additional image of the object, a location of each of the four corners of the object in an image plane defined by the additional image;
    d. determining, by the computer system, based on the speed and direction of movement of the vehicle and the estimated locations of the four corners, a corrected location in 3D space for each of the four corners of the object;
    e. determining, by the computer system, a first compensated location for each of the four corners of the object in the image plane;
    f. repeating steps a through d and determining, by the computer system, a second compensated location for each of the four corners of the object in the image plane; and
    g. determining, by the computer system, a difference between the first compensated locations of the four corners of the object and the second compensated locations of the four corners of the object.

2. The method according to claim 1, wherein estimating the speed and the direction of movement of the vehicle further comprises determining, by the computer system, a distance from the camera sensor to each one of the plurality of images of the object.

3. The method according to claim 1, wherein estimating the speed and the direction of movement of the vehicle is further based on an acquisition time of each one of the plurality of images of the object.

4. The method according to claim 1, wherein determining the first and second compensated locations of the four corners of the object further comprises projecting, by the computer system, the corrected locations of the four corners in 3D space onto the image plane.

5. The method according to claim 1, wherein estimating the speed and the direction of movement of the vehicle is further based on a known location of the object.

6. The method according to claim 1, wherein the vehicle is a robot.

7. A moving vehicle comprising:
    a camera sensor; and
    a processor coupled to the camera sensor,
    wherein the processor is configured to
    a. estimate, based on a plurality of images of an object acquired by the camera sensor, the object having four corners, a speed and a direction of movement of the moving vehicle;
    b. receive, from the camera sensor, an acquired additional image of the object, wherein the additional image includes the four corners of the object;
    c. estimate, based on the additional image of the object, a location of each of the four corners of the object in an image plane defined by the additional image;
    d. determine, based on the speed and direction of movement of the camera sensor and the estimated locations of the four corners, a corrected location in 3D space for each of the four corners of the object;
    e. determine a first compensated location for each of the four corners of the object in the image plane;
    f. repeat steps a through d and determine a second compensated location for each of the four corners of the object in the image plane; and
    g. determine a difference between the first compensated locations of the four corners of the object and the second compensated locations of the four corners of the object.

8. The moving vehicle according to claim 7, wherein, to estimate the speed and the direction of movement of the robot, the processor is further configured to determine a distance from the camera sensor to each one of the plurality of images of the object.

9. The moving vehicle according to claim 7, wherein estimating the speed and the direction of movement of the camera sensor is further based on an acquisition time of each one of the plurality of images of the object.

10. The moving vehicle according to claim 7, wherein, to determine the first and second compensated locations of the four corners of the object, the processor is further configured to project the corrected locations of the four corners in 3D space onto the image plane.

11. The moving vehicle according to claim 7, wherein estimating the speed and the direction of movement of the moving vehicle is further based on a known location of the object.

12. A robot comprising:
a mobile base;
a camera sensor mounted on the mobile base; and
a processor coupled to the camera sensor,
wherein the processor is configured to
  a. estimate, based on a plurality of images of an object acquired by the camera sensor, the object having four corners, a speed and a direction of movement of the robot;
  b. receive, from the camera sensor, an acquired additional image of the object, wherein the additional image includes the four corners of the object;
  c. estimate, based on the additional image of the object, a location of each of the four corners of the object in an image plane defined by the additional image;
  d. determine, based on the speed and direction of movement of the camera sensor and the estimated locations of the four corners, a corrected location in 3D space for each of the four corners of the object;
  e. determine a first compensated location for each of the four corners of the object in the image plane;
  f. repeat steps a through d and determine a second compensated location for each of the four corners of the object in the image plane; and
  g. determine a difference between the first compensated locations of the four corners of the object and the second compensated locations of the four corners of the object.

\* \* \* \* \*